United States Patent [19]

Decesare

[11] Patent Number: 5,685,083
[45] Date of Patent: Nov. 11, 1997

[54] COMBINATION PLUMB AND LEVEL DEVICE

[76] Inventor: Dominic Decesare, 223 Center St., Elizabeth, N.J. 07202

[21] Appl. No.: 616,276

[22] Filed: Mar. 15, 1996

[51] Int. Cl.⁶ .................................................. G01C 9/36
[52] U.S. Cl. ........................................... 33/390; 33/382
[58] Field of Search ........................... 33/390, 376, 370, 33/371, 372, 373, 381, 382, 383

[56] References Cited

U.S. PATENT DOCUMENTS

| | | | |
|---|---|---|---|
| 2,570,430 | 10/1951 | Cramer | 33/370 |
| 2,635,350 | 4/1953 | Bettega | 33/381 |
| 2,748,494 | 6/1956 | Raney | 33/383 |
| 2,791,036 | 5/1957 | Gericke | 33/382 |
| 2,833,054 | 5/1958 | Wheeler | 33/382 |
| 2,906,031 | 9/1959 | Rice | 33/382 |
| 3,724,087 | 4/1973 | Ostrager | 33/383 |
| 3,820,249 | 6/1974 | Stone | 33/382 |
| 5,408,752 | 4/1995 | Eadens | 33/390 |

*Primary Examiner*—Thomas B. Will
*Attorney, Agent, or Firm*—Lackenbach Siegel Marzullo Aronson & Greenspan, P.C.

[57] ABSTRACT

A generally conventional plumb level having an elongate rectangular body and generally defining an elongate axis is provided with a circular level element at one end surface of its elongate body. A square or right angle abutment contact surface, which is formed by a flat base which is attached to and projects laterally beyond spaced parallel surfaces of the rectangular body for engaging and contacting a structural member to be aligned. The circular level element is either permanently attached to the elongate body or removably attached, in which case it is movable between operative and inoperative positions which do not interfere with the proper placement of the structural member against the abutment contact combination device.

15 Claims, 2 Drawing Sheets

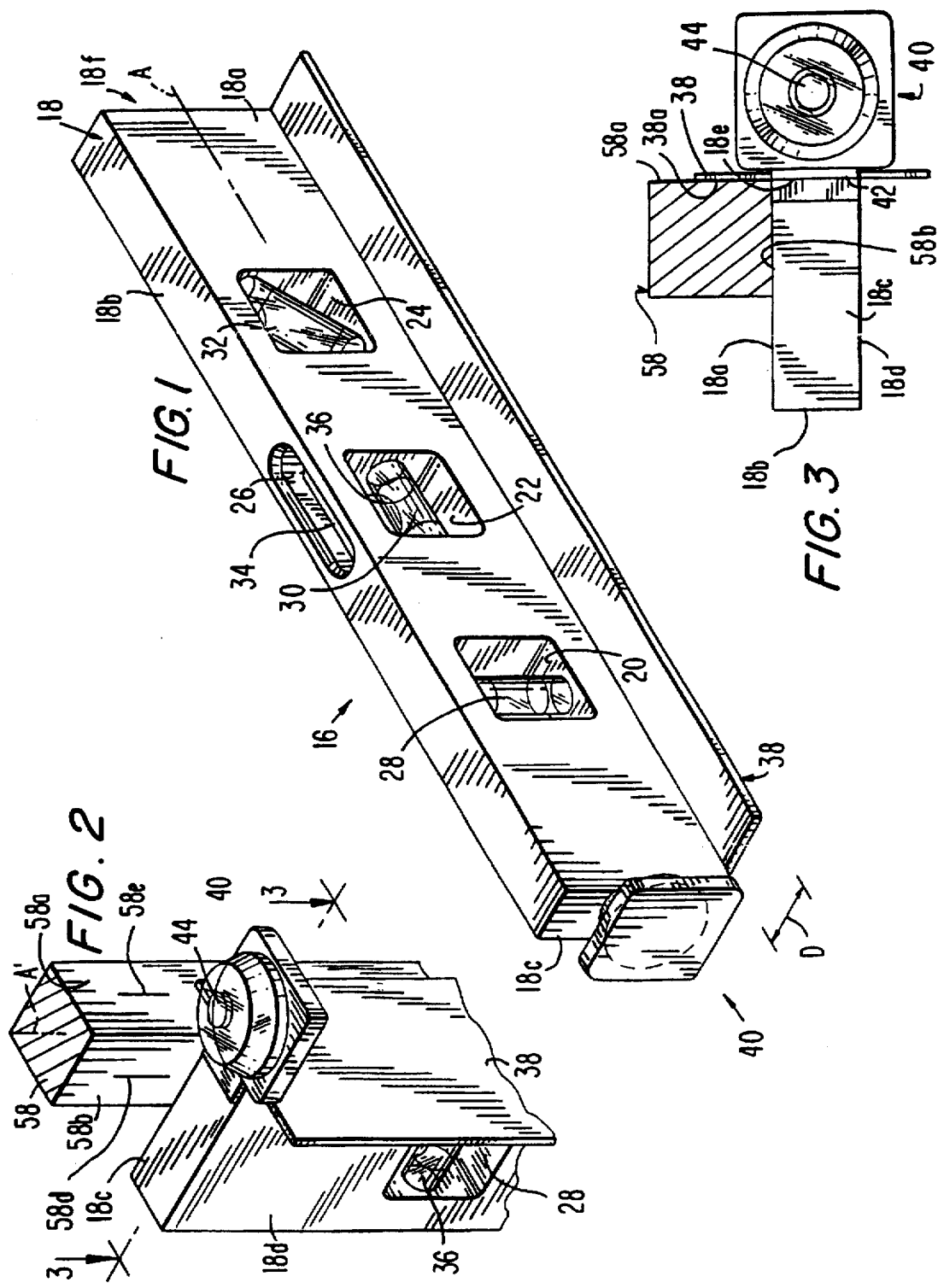

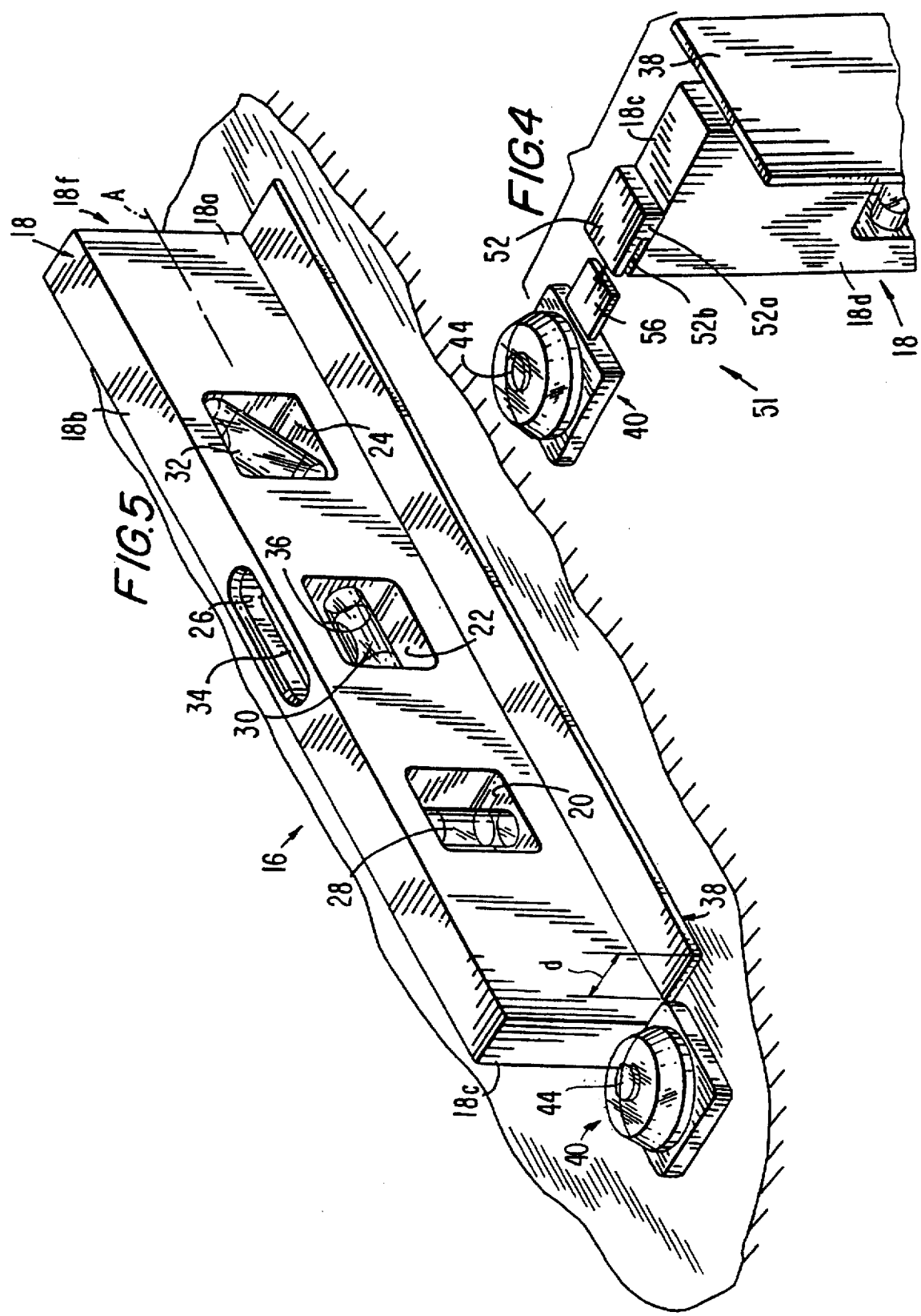

COMBINATION PLUMB AND LEVEL DEVICE

BACKGROUND OF THE INVENTION

1. Field of the Invention

This invention generally relates to craftsmen's tools and, more specifically, to a combination plumb and level device.

2. Description of the Prior Art

Various prior art aligning and levelling devices used by skilled craftsmen usually embody two or more tubular spirit level inserts and generally have a longitudinally extended box-like body provided with transversely opposed, longitudinally extending aligning sides. With such known plumb levels it is necessary for structural members and other related components to be levelled on two sides with a level requiring manual positioning thereon while such members or components are being nailed or otherwise suitably fixed in their properly aligned and/or levelled positions. Such operations require either two craftsmen or an operation by one craftsman whereby he progressively takes a reading and then empirically endeavors to fix the member at the desired position, or further endeavors to hold the level with one hand and to both align and fix the member in place with the other hand. Examples of such levelling devices are illustrated in U.S. Pat. Nos. 613,246; 2,998,655; 3,167,864; and 5,245,758. In order to facilitate the use of such tools, a number of levels have been proposed which have an L-shaped or V-shaped configuration intended to abut the work on more than one side or contact the work at least two points. One such plumb level is disclosed in U.S. Pat. No. 1,845,801 in which conventional tubular spirit levels are arranged at various planes of the level. The use of conventional or tubular spirit levels are also disclosed in U.S. Pat. Nos. 657,443; 659,513; 1,749,980; and 2,667,703. A post level defined by a pair of right-angled walls and utilizing horizontal bubble vials of tubular spirit levels in each wall and a vertical bubble vial at the intersection of the walls is disclosed in U.S. Pat. No. 5,207,004. However, as with the prior mentioned designs, the use of multiple tubular level vials increases the cost of such alignment tools as well as complicates the use thereof since it requires inspection of a plurality of such tubular vials. This is also true for a corner level apparatus disclosed in U.S. Pat. No. 5,119,565.

In U.S. Pat. No. 3,832,782, a level is disclosed which is intended to be a multiple purpose leveling device which includes a body having divergently forked legs, enabling the levelling device to be held against pipes and other round objects. One feature of the level is that three 360° annular tube spirit level inserts are embodied in three 90° diverse planes. By the use of any two of the three bubbles of the spirit levels, two or more readings can be made simultaneously for one setting. The details of the annular tube spirit level inserts used are disclosed in FIG. 12 of this patent, which are described as tubular spirit levels which include an outer body surrounding a 360° annular tubular spirit level filled with a suitable liquid and forming the usual air bubble. A center disk or annular body is also preferably part of the sub-assembly and is calibrated to indicate the more commonly used 45° and 90° angular settings and the intermediate mid-point divisions thereof. It is clear that with the level disclosed in this patent at least two indications must be used to obtain an accurate plumb reading.

A universal spirit level is disclosed in U.S. Pat. No. 3,545,091 in which a longitudinally extending main body is provided with a V-shaped recess facing towards the structural member to be aligned. The open portion has interfaces that are planar and approximately 90° or in right-angular relationship. Primary and secondary handles are provided, tubular spirit level elements for horizontal and vertical alignment readings being carried in adjacent relationship to provide rough alignment readings, and a cylindrical type spirit level is positioned in a hollow portion of an adjacent inner end of the primary handle so that it can be viewed looking upwardly or downwardly substantially along the tool device and may be employed for a final, full alignment determination from the standpoint of both vertical and horizontal planes. Therefore, the tubular spirit level elements are used initially for a rough alignment and a cylindrical type of spirit level is provided for a more final, full alignment. However, the cylindrical spirit level element is fixedly mounted at the end of the primary handle, and is situated intermediate between the longitudinal or axial ends of the level device. As such, depending on how the device is held or at what angle it is held, the cylindrical spirit level may not be readily visible. Also, being fixed on the handle as disclosed limits the usefulness of the device and the versatility to determine the plumb condition for a number of different elements or members to be aligned.

SUMMARY OF THE INVENTION

It is an object of the present invention to provide a combination plumb and level device which does not have the disadvantages inherent in such prior art devices.

It is another object of the present invention to provide a combination plumb and level device which is simple in construction and economical to manufacture.

It is still another object of the present invention to provide a plumb and level device of the type suggested which is extremely simple and convenient to use.

It is yet another object of the present invention to provide a combination plumb and level device as suggested in the previous objects which is extremely versatile and may be used to level diverse structural and other elements with but a single reading.

It is a further object of the present invention to provide a combination plumb and level device which can readily be formed or created by simply modifying conventional commercially available carpenters' levels.

In order to achieve the above objects as well as others which will become apparent hereinafter, a combination plumb and level device in accordance with the present invention is used for establishing both level and/or plumb orientations of a structural number which has a longitudinal axis and at least two lines of contact parallel to said longitudinal axis. The device comprises an elongate body having a generally rectangular cross section and forming mutually orthogonal first and second pairs of spaced parallel sides and end surfaces normal to said pairs of spaced sides. Said elongate body has at least one tubular levelling means visible through at least one of said sides for establishing whether the structural member is level. A substantially flat base is attached to and extends along one of the sides of said first pair of sides and projects laterally of said body and is normal to said second pair of sides to form with each second side a 90° abutment surface for contacting the structural member to be oriented along its two lines of contact. The abutment surface fixes the orientation of said body axis parallel relative to said longitudinal axis when in contact with said at least two lines of contact. Circular level means is provided at one end surface of said elongate body in an operative position which does not prevent or interfere with the positioning of a structural member in contact with an abutment surface. Said circular level means centers an air bubble in its operative position to provide an indication of plumb orientation of the structural member only when abutment of that abutment surface with said at least two contact lines on the elongate member arranges both said axes in a substantially vertical orientation.

BRIEF DESCRIPTION OF THE DRAWINGS

The aforementioned objects and other features of the present invention will become more apparent from the following description in conjunction with the accompanying drawings, wherein:

FIG. 1 is a perspective view of a combination plumb and level device in accordance with the present invention, shown in an inoperative condition or when the device is not in use;

FIG. 2 is a fragmented perspective view of the plumb and level device of in FIG. 1, shown in an operative condition to measure the plumb orientation of a structural member;

FIG. 3 is a top plan view of the plumb and level device shown in FIG. 1;

FIG. 4 is similar to FIG. 2, but showing a modified embodiment in which the circular level is selectively removable; and FIG. 5 is similar to FIG. 1, but showing the plumb and level device when used as a leveling device on a substantially horizontal surface.

DESCRIPTION OF THE PREFERRED EMBODIMENTS

Referring now specifically to the Figures, in which identical or similar parts are designated by the same reference numerals throughout, one embodiment of a combination plumb and level device in accordance with the present invention is generally designated by the reference numeral 16. An important feature of the present invention is that the level 16 is generally of a very common or conventional type which is readily available commercially. Such a level 16 includes an elongate body 18 which generally defines a longitudinal axis A, and has a generally rectangular cross-section which forms two mutually orthogonal first and second pairs of spaced parallel sides. One pair of parallel sides includes sides 18a, 18d, while the other pair of spaced parallel sides includes sides 18b, 18e, best shown in FIG. 3. End surfaces 18c, 18f (see FIG. 1) are normal to the pairs of spaced parallel sides 18a, 18b, 18d, 18e.

Substantially incorporating a standard or conventional levelling device, the body 16 includes at least one hermetically sealed tubular bubble or spirit level vial or capsule element visible through at least one of the sides, such as 18a, 18b or 18d, for establishing whether a structural member is level or inclined at a predetermined angle relative to the vertical or the horizontal. Although the arrangements will vary from unit to unit, the illustrated level 16 includes three generally rectangular openings or windows 20, 22 and 24 which open through the side surfaces 18a, 18d and from a generally elongate window 26 in side 18b. Inside each of these windows there is provided a conventional tubular level vial which is filled with a suitable fluid, such straight tubular vial or capsule elements 28, 30 and 32 being disposed within the windows or openings 20, 22 and 24 respectively. The tubular level elements or vials 28 and 30 are generally normal or perpendicular relative to each other, while the level member or vial 32 is inclined at 45° to both of the aforementioned leveling elements. A tubular level member 34 is generally parallel to the tubular level member 30 and can be omitted when the tubular level member 30 is sufficiently close to the window or opening 26 so as to be visible therethrough.

While the totally conventional bubble or spirit leveling elements 28, 30, 23 and 34 are not utilized in the determination of the plumb condition and are shown since they form part of the conventional leveling devices which are intended to be modified in the manner to be described in order to create the combination plumb and level device 16 of the present invention.

An important feature of the present invention is the provision of a substantially flat base 38 which is attached to and extends along one of the sides 18b, 18e of the first pair of spaced parallel small sides 18b, 18e. The flat base 38 projects laterally relative to the body 18 and is normal to the second pair of sides 18a, 18d to form with each such second side a 90° abutment surface which can be used for contacting two parallel contact lines of a structural member 58 (FIG. 2) to be oriented along the plumb direction.

Shown in FIG. 1 is a circular level element 40 at one end surface 18c of the elongate body 18 in an inoperative condition with the circular level folded upon itself and arranged in proximity or abutting against the end surface 18c. A feature of the invention is that the circular level 40 is arranged relative to the elongate body, during use, in a position which does not prevent or interfere with the positioning of the structural member which is in contact with an abutment surface, as best shown in FIGS. 2 and 3. The circular level 40 centers an air bubble 44, in its operative position to provide an indication of plumb orientation of the structural member only when abutment of an abutment surface of the device 16 with the surfaces 58a, 58b of the structural element 58 and the two contact lines 58d, 58e on the structural member arranges both of the axes A, A' in substantial vertical orientations.

While four tubular bubble or spirit level vials or capsule elements are illustrated in FIG. 1, it is clear that any number of such elements may be used, although a plurality of elements of this type are normally provided on conventional levels.

As best shown in FIG. 3, the circular level 40 is advantageously positionable on the reverse or other side of the flat base 38 relative to the elongate body 18 in the operative position so that the circular level element is offset from the space normally occupied by the structural member 58 when in abutment with the abutment surfaces formed by the flat plate 38 and each of the respective surfaces 18a and 18d. Thus, the circular level 40 may be mounted on the end surface 18c by means of a hinge 42 for movement from the operative shown in FIGS. 2 and 3 to a position generally coextensive with the end surface 18c on the same side as the elongate body relative to the base plate 38 when the circular level is not used to plumb measurements. This latter condition is illustrated, for example, in FIG. 1.

The circular level element 40 may be attached to the end surface 18c in any one of a number of different ways. Thus, the circular level may be permanently attached to the end surface, as long as some means is provided to move the circular element to a position which ensures that it does not interfere with the proper positioning of the structural element to be oriented with relation to the abutment surfaces formed by the flat plate 38 and the surfaces 18a and 18d. However, while the circular level 40 may be permanent attached to the end surface 18c, such as by use of adhesive, the circular level is preferably movably mounted, such as by means of a hinge 42 (FIG. 3). However, the circular level 40 may also be removably attached to the end surface 18c. In accordance with a variant of the embodiment shown in FIGS. 1–3, FIG. 4 illustrates a construction which provides a retainer 52 provided with an open slot 52b, which is attached to the end surface 18c by means of a base or spacer element 52a to provide a slot 52b. With such retainer 52, the circular level 40 includes a tab 56 which is slidably receivable within the slot 52b of the retainer member. Thus, the circular level 40 may be readily removed when not in use and quickly attached to the conventional level 16 by sliding the tab 56 into the slot 52b. A slight interference or friction fit should be sufficient to retain the circular level in place during normal use.

Referring to FIG. 5, the combination level of plumb device shown in FIG. 1 is illustrated supported on a flat surface. In this condition, the circular level is preferably positioned or moved about the supporting hinge 42 to bring the circular level 40 substantially into the plane of the flat base 38. With this arrangement, the level 16 can be used for conventional leveling procedures.

While the distances that the flat base 38 projects laterally beyond each of the associated sides 18a, 18d is not critical, it is clear that the distance D (FIG. 1) on each side of the body 18 must be sufficient so as to be capable of engaging the structural member 58 on at least two surfaces thereof along two parallel lines of contact. Such projection D should be at least 1/16" to each side of the body 18, although it is recommended that the flat base 38 project to each side of the body a distance approximately within the range of 1/8–1/2" minimum.

For purposes of the present invention, a circular level element 40 is generally of the type that includes a base and a circular wall which projects upwardly from the base to form a generally circular compartment which is filled with a suitable fluid and a transparent upper wall provided to close the compartment. An air bubble 44 is permitted to gravitate to different parts of the compartment as a function of the orientation of the base, the bubble positioning itself at the very center of the base in the compartment when the base is arranged in a substantially horizontal plane. Such a level is described, for example, in U.S. Pat. No. 612,577. See also U.S. Pat. Nos. 3,545,091 and 3,782,524, which illustrate circular levels of the type under discussion mounted on specially constructed universal leveling devices. However, this type of levelling device is to be distinguished from the annular leveling device of the type disclosed in U.S. Pat. No. 3,832,782 which does not allow a bubble to move to the very center of the level, but two such levelling devices are needed to make a reading as aforementioned.

It is also possible, with one feature of the present invention, to detachably secure the flat plate 38 to the elongate body 18 by any conventional means, such as screw fasteners or the like. Where the elongate body 18 is made of a magnetic material, the flat base 38 can also be magnetized or made of a magnetizable material so that it can be selectively attached to the body 18 by placing these elements into contact and thereafter be retained by the resulting magnetic forces. With such an arrangement, the leveling device can be used without the flat base 38 when the same is not needed for plumb measurements. However, because the flat plate 38 need only project a very small distance laterally of each of the sides 18a, 18d, it may be just as convenient to permanently attach and retain the flat plate 38 on the body 18 so that these components or members need not be separated from each other and one possibly misplaced.

While this invention has been described in detail with particular reference to a preferred embodiment thereof, it will be understood that variations and modification will be effected within the spirit and scope of the invention as described herein and as defined in the appended claims.

I claim:

1. Combination plumb and level device for establishing both level and/or plumb orientations of a structural member which has a longitudinal axis and at least two lines of contact parallel to said longitudinal axis, the device comprising an elongate body having a generally rectangular cross section and forming mutually orthogonal first and second pairs of spaced parallel sides and end surfaces normal to said pairs of spaced sides, said elongate body having at least one tubular leveling means visible through at least one of said sides for establishing whether the structural member is level; a substantially flat base attached to and extending along one of the sides of said first pair of sides and projecting laterally of said body and being normal to said second pair of sides for forming with each second side a 90° abutment surface for contacting the structural member to be oriented said abutment surface fixing the orientation of said body axis parallel relative to said longitudinal axis when in contact with said at least two lines of contact; and circular level means at one end surface of said elongate body; means for movably mounting said circular level means between an inoperative position and in an operative position which does not prevent positioning a structural member in contact with either one of said abutment surfaces, said circular level means centering an air bubble in its operative position to provide an indication of plumb orientation of the structural member only when at least two contact lines on the structural member arranges both said axes in substantially vertical orientations.

2. Combination plumb and level device as defined in claim 1, wherein a plurality of tubular leveling means are provided along said body for leveling the structural member at different angles in relation to the vertical.

3. Combination plumb and level device as defined in claim 1, wherein said at least one tubular leveling means is visible through said second pair of sides.

4. Combination plumb and level device as defined in claim 1, wherein said circular level means is positioned on the other side of said flat base relative to said elongate body in the operative position.

5. Combination plumb and level device as defined in claim 4, wherein said means for movably mounting said circular level means on said end surface.

6. Combination plumb and level device as defined in claim 1, wherein said circular level means is permanently attached to said end surface.

7. Combination plumb and level device as defined in claim 1, wherein said circular level means is adhesively attached to said end surface.

8. Combination plumb and level device as defined in claim 1, wherein said flat base is attached to one of said first sides by means of adhesive.

9. Combination plumb and level device as defined in claim 1, wherein said circular level member is positionable in a plane of said flat base.

10. Combination plumb and level device as defined in claim 1, wherein said tubular leveling means is visible through the other side of said first pair of sides.

11. Combination plumb and level device as defined in claim 1, wherein said flat base projects laterally substantially equally to each side of said body.

12. Combination plumb and level device as defined in claim 11, wherein said flat base projects at least 1/16 inch to each side of said body.

13. Combination plumb and level device as defined in claim 12, wherein said flat base projects to each side of said body approximately within the range of 1/8–1/4 inch.

14. Combination plumb and level device as defined in claim 4, wherein said means for movably mounting said circular level means on said end surface comprises a hinge for movement from said operative position on said other side of said flat base to a non-operative position generally coextensive with said end surface on the same side as said elongate body when said circular level means is not used for plumb measurements.

15. Combination plumb and level device for establishing both level and/or plumb orientations of a structural member which has a longitudinal axis and at least two lines of contact parallel to said longitudinal axis, the device comprising an elongate body having a generally rectangular cross section and forming mutually orthogonal first and second pairs of spaced parallel sides and end surfaces normal to said pairs of spaced sides, said elongate body having at least one tubular leveling means visible through at least one of said sides for establishing whether the structural member is level; a substantially flat base attached to and extending along one of the sides of said first pair of sides and projecting laterally of said body and being normal to said second pair of sides for forming with each second side a 90° abutment surface for contacting the structural member to be oriented said abutment surface fixing the orientation of said body axis parallel relative to said longitudinal axis when in contact with said at least two lines of contact; and circular level means at one end surface of said elongate body in an operative position which does not prevent positioning a structural member in contact with abutment surfaces, said circular level means centering an air bubble in its operative position to provide an indication of plumb orientation of the structural member only when at least two contact lines on the structural member arranges both said axes in substantially vertical orientations, being removably attached to said end surface, said end surface being provided with a slotted retainer member and said circular level means includes a tab which is slidably receivable within the slot in said retainer member.

* * * * *